(12) United States Patent
Stöbich et al.

(10) Patent No.: US 9,127,501 B1
(45) Date of Patent: Sep. 8, 2015

(54) LEAD SYSTEM FOR A FIRE AND SMOKE PROTECTION DEVICE

(71) Applicant: Stoebich Brandhschutz GmbH, Goslar (DE)

(72) Inventors: Jochen Stöbich, Langelsheim (DE); Stefan Siller, Lutter am Barenberge (DE); Frank Krüger, Bad Harzburg (DE); Robert Knein-Linz, Herzogenrath (DE)

(73) Assignee: Stoebich Brandschutz GmbH, Goslar (DE)

( * ) Notice: Subject to any disclaimer, the term of this patent is extended or adjusted under 35 U.S.C. 154(b) by 0 days.

(21) Appl. No.: 13/738,806

(22) Filed: Jan. 10, 2013

Related U.S. Application Data

(60) Provisional application No. 61/584,883, filed on Jan. 10, 2012.

(51) Int. Cl.
  *E06B 9/17* (2006.01)
  *E06B 9/40* (2006.01)
  *E06B 9/58* (2006.01)

(52) U.S. Cl.
  CPC ... *E06B 9/40* (2013.01); *E06B 9/58* (2013.01); *E06B 9/581* (2013.01)

(58) Field of Classification Search
  CPC .............. E06B 9/40; E06B 9/581; E06B 9/58
  USPC .............. 160/267.1, 271, 273, 264, 272, 274, 160/284, 287, 121.1, 120, 268.1, 270, 273.1
  See application file for complete search history.

(56) References Cited

U.S. PATENT DOCUMENTS

| 1,705,085 | A | * | 3/1929 | Duncanson | 160/271 |
| 3,877,525 | A | * | 4/1975 | Husson et al. | 169/48 |
| 4,453,584 | A | * | 6/1984 | Steele | 160/121.1 |
| 4,478,268 | A | * | 10/1984 | Palmer | 160/310 |
| 4,601,320 | A | * | 7/1986 | Taylor | 160/271 |
| 4,649,981 | A | * | 3/1987 | Bibeau | 160/120 |
| 5,056,579 | A | * | 10/1991 | Krafutler | 160/271 |
| 5,058,651 | A | * | 10/1991 | Ashley et al. | 160/271 |
| 5,141,044 | A | * | 8/1992 | Hying et al. | 160/271 |
| 5,291,932 | A | * | 3/1994 | Kraeutler | 160/84.01 |
| 5,326,212 | A | * | 7/1994 | Roberts | 414/347 |

(Continued)

*Primary Examiner* — Katherine Mitchell
*Assistant Examiner* — Johnnie A Shablack
(74) *Attorney, Agent, or Firm* — Whitham Curtis Christofferson & Cook, PC

(57) ABSTRACT

A lead system for a fire/smoke protection device that enables deployment/retraction of the device's flexible protection member relative to a building wall opening and improves the member's resistance to forces. The system comprises lead guides for guiding the flexible protection member between storage and protection configurations, for permitting stretching when a force is applied, and for transferring forces to the building. The guides are configured with the flexible protection member to slidably receive member loops extending about lead members. The guides and lead members are also configured to allow lead member movement and permit elastic deformation or destruction of connections between certain internal guide components, when a force is exerted on the flexible protection member. Additionally, the system comprises one or more members configured with a flexible protection member having a bar to enable bar movement during stretching of the flexible protection member responsive to a force.

5 Claims, 5 Drawing Sheets

(56) References Cited

U.S. PATENT DOCUMENTS

| | | | | |
|---|---|---|---|---|
| 5,351,742 A * | 10/1994 | Lichy | | 160/273.1 |
| 5,379,823 A * | 1/1995 | Kraeutler | | 160/271 |
| 5,392,836 A * | 2/1995 | West et al. | | 160/273.1 |
| 5,394,926 A * | 3/1995 | Kraeutler | | 160/264 |
| 5,482,104 A * | 1/1996 | Lichy | | 160/273.1 |
| 5,526,865 A * | 6/1996 | Coenraets | | 160/272 |
| 5,601,133 A * | 2/1997 | Krupke et al. | | 160/265 |
| 5,632,317 A * | 5/1997 | Krupke et al. | | 160/265 |
| 5,839,493 A * | 11/1998 | Quasius | | 160/133 |
| 5,862,851 A * | 1/1999 | Stoebich et al. | | 160/121.1 |
| 5,964,270 A * | 10/1999 | Kirkey et al. | | 160/273.1 |
| 6,021,837 A * | 2/2000 | Miller | | 160/133 |
| 6,035,918 A * | 3/2000 | Kraeutler | | 160/84.06 |
| 6,065,525 A * | 5/2000 | Wells | | 160/273.1 |
| 6,152,208 A * | 11/2000 | Kalempa et al. | | 160/273.1 |
| 6,260,601 B1 * | 7/2001 | Thomas | | 160/133 |
| 6,357,507 B1 * | 3/2002 | Stoebich et al. | | 160/41 |
| 6,363,575 B1 * | 4/2002 | Kaser | | 16/48.5 |
| 6,722,416 B2 * | 4/2004 | Varley et al. | | 160/264 |
| 6,942,003 B2 * | 9/2005 | Thompson | | 160/268.1 |
| 7,028,741 B2 * | 4/2006 | Coenraets | | 160/273.1 |
| 7,131,481 B2 * | 11/2006 | Varley et al. | | 160/273.1 |
| 7,389,807 B2 * | 6/2008 | Nagare et al. | | 160/273.1 |
| 7,464,743 B1 * | 12/2008 | Berger, Jr. | | 160/273.1 |
| 7,516,770 B2 * | 4/2009 | Jerry | | 160/267.1 |
| 8,109,317 B2 * | 2/2012 | Bostyn | | 160/273.1 |
| 8,113,265 B2 * | 2/2012 | Hardison et al. | | 160/273.1 |
| 8,272,425 B2 * | 9/2012 | Coenraets | | 160/273.1 |
| 8,291,960 B2 * | 10/2012 | Bowman | | 160/267.1 |
| 8,297,333 B2 * | 10/2012 | Meichtry | | 160/210 |
| 8,443,909 B2 * | 5/2013 | Wong | | 169/48 |
| 8,602,081 B2 * | 12/2013 | Komatsu et al. | | 160/273.1 |
| 8,607,842 B2 * | 12/2013 | Drifka | | 160/274 |
| 8,662,138 B2 * | 3/2014 | Komatsu et al. | | 160/272 |
| 8,851,147 B2 * | 10/2014 | Drifka et al. | | 160/273.1 |
| 8,851,149 B2 * | 10/2014 | Komatsu et al. | | 160/310 |
| 8,887,789 B2 * | 11/2014 | Tremaine et al. | | 160/273.1 |
| 8,887,790 B2 * | 11/2014 | Drifka | | 160/273.1 |
| 2003/0034135 A1 * | 2/2003 | Simon | | 160/271 |
| 2005/0211397 A1 * | 9/2005 | Coenraets | | 160/271 |
| 2005/0211398 A1 * | 9/2005 | Coenraets | | 160/271 |
| 2006/0144530 A1 * | 7/2006 | Nagare et al. | | 160/271 |
| 2007/0277941 A1 * | 12/2007 | Jansen et al. | | 160/271 |
| 2010/0006239 A1 * | 1/2010 | Kraeutler | | 160/272 |
| 2010/0101739 A1 * | 4/2010 | Coenraets | | 160/267.1 |
| 2011/0108214 A1 * | 5/2011 | Komatsu et al. | | 160/272 |
| 2012/0241105 A1 * | 9/2012 | Drifka et al. | | 160/133 |
| 2012/0241110 A1 * | 9/2012 | Drifka et al. | | 160/271 |
| 2012/0255684 A1 * | 10/2012 | Krueger et al. | | 160/133 |
| 2013/0255893 A1 * | 10/2013 | Stobich et al. | | 160/268.1 |
| 2013/0306252 A1 * | 11/2013 | Lambridis et al. | | 160/133 |
| 2014/0158313 A1 * | 6/2014 | McTavish et al. | | 160/270 |
| 2014/0190097 A1 * | 7/2014 | Drifka et al. | | 52/204.1 |
| 2014/0190709 A1 * | 7/2014 | Stoebich et al. | | 169/48 |
| 2014/0345812 A1 * | 11/2014 | Casey et al. | | 160/273.1 |

\* cited by examiner

LEAD SYSTEM FOR A FIRE AND SMOKE PROTECTION DEVICE

CROSS REFERENCE TO RELATED APPLICATIONS

This application claims the benefit of priority to and incorporates herein by this reference in its entirety, U.S. provisional patent application Ser. No. 61/584,883, which is entitled "Smoke or Fire Protection Device" and filed on Jan. 10, 2012.

FIELD OF THE INVENTION

The present invention relates, generally, to the field of systems, including apparatuses and methods, for limiting the spread of fire and smoke in a building structure.

BACKGROUND OF THE INVENTION

Fires within building structures often start in a single room or location and spread from room-to-room traveling through interior doorways and other openings. As fires progress through building structures burning various combustible materials, a substantial amount of smoke is generally produced with such smoke potentially including toxic gases that are generated when certain materials and chemical compounds are oxidized. While the fires can cause significant property damage and destroy or weaken building structures, the smoke and toxic gases can cause substantial physical injury or death to persons who inhale them. Thus, by limiting the spread of fires and smoke within building structures, damage to property and building structures may be minimized and physical injury to, and the potential death of, persons within building structures may be prevented.

Many attempts have been made to develop devices that limit the spread of fire and smoke through doorways and other openings in building structures. Unfortunately, many of the devices have been found to become mechanically unstable after a fire. Therefore, a number of jurisdictions have begun requiring such devices to pass a test known as the "Hose Stream Test" in order to be approved for use in their jurisdiction. The Hose Stream Test is generally run on a device for limiting the spread of fire and smoke after it has been exposed to high temperatures over a long period of time during a separate fire test. In the Hose Stream Test, a jet of water such as that produced by a fire hose is directed at the device, generally, from a direction that is normal to the device. To pass the Hose Stream Test, the device must withstand the forces exerted on the device by the water jet and not become mechanically unstable.

Typically, the devices that have been developed to limit the spread of fire and smoke fall into two categories. A first type of devices has attempted to limit the spread of fire and smoke by sealing openings with flexible protection members including a plurality of slats. Examples of such devices include fire protection roller shutters, fire doors, and curtains made of metal components that slide over and relative to one another. Advantageously, these devices limit the spread of fire and smoke while being capable of withstanding mechanical loads particularly well, including after exposure to fire. As a consequence, many such devices have passed the Hose Stream Test. Unfortunately, these devices are typically heavy and require a large amount of space. Also, in order to use some of these devices, ceilings in buildings must be designed in a manner that enables the devices to be built into or supported by the ceilings, thereby limiting an architect's design freedom. Additionally, these devices are time-consuming to produce and are, thus, expensive.

A second type of devices, commonly known as "fire protection curtains", have attempted to limit the spread of fire and smoke by sealing openings with a flexible protection member manufactured from a fire resistant material that can be wound around a reel or winding shaft. The fire resistant materials used in such devices typically include woven textile fabrics having warp and weft threads. The flexible protection members are generally stretched by a plurality of wires that extend between rollers moving in guides mounted relative to an opening in a building wall. Beneficially, these devices reduce the spread of fire and smoke, are relatively light in weight, and save space. However, these devices are generally less resistant to mechanical influences and loads than devices of the first type described above. Additionally, after exposure to the heat of a fire, the flexible protection members tend to become brittle and tear when struck with a stream of extinguishing water during a fire. Consequentially, many of these devices cannot pass the Hose Stream Test.

There is, therefore, a need in the industry for a system for deploying, retracting and supporting fire protection curtains that is lightweight, requires minimal space, is capable of improving the resistance of fire protection curtains to mechanical loads during and after exposure to fire, enables fire protection curtains to pass the Hose Stream Test, and that solves the difficulties, problems, and shortcomings of existing systems.

SUMMARY

Broadly described, the present invention comprises a lead system for a fire and smoke protection device, including apparatuses and methods, that enables the deployment and retraction of a flexible protection member of a fire and smoke protection device relative to an opening in a wall and that improves the resistance of the flexible protection member to forces exerted thereon. According to the example embodiments, the lead system comprises a pair of opposed, elongate lead guides for guiding a flexible protection member between a retracted, storage configuration and a fully-deployed, protection configuration, for permitting the flexible protection member to stretch and bulge when a force is applied to the flexible protection member, and for transferring forces to the building to which the elongate lead guides are secured. The elongate lead guides are configured cooperatively with the flexible protection member to slidably receive loops extending from the flexible protection member about elongate lead members thereof. The elongate lead guides and lead members thereof are also configured cooperatively to allow limited movement by the elongate lead members and to permit the elastic deformation or destruction of connections between certain internal components of the elongate lead guides, when a force is exerted on the flexible protection member. Additionally, the lead system comprises one or more members configured cooperatively with a flexible protection member having a bar so as to enable movement of the bar permitting stretching and bulging of the flexible protection member in response to a force being applied to the flexible protection member.

Advantageously, the lead system enables the deployment and retraction of a flexible protection member relative to an opening in a building wall, the flexible protection member being adapted to limit the spread of fire and smoke through the opening. Also, the lead system beneficially improves the resistance of the flexible protection member by allowing the flexible protection member to stretch and bulge in response to the application of a force thereto.

Various uses and benefits of the present invention may become apparent upon reading and understanding the present specification when taken in conjunction with the appended drawings.

DETAILED DESCRIPTION OF THE DRAWINGS

Figure 1:
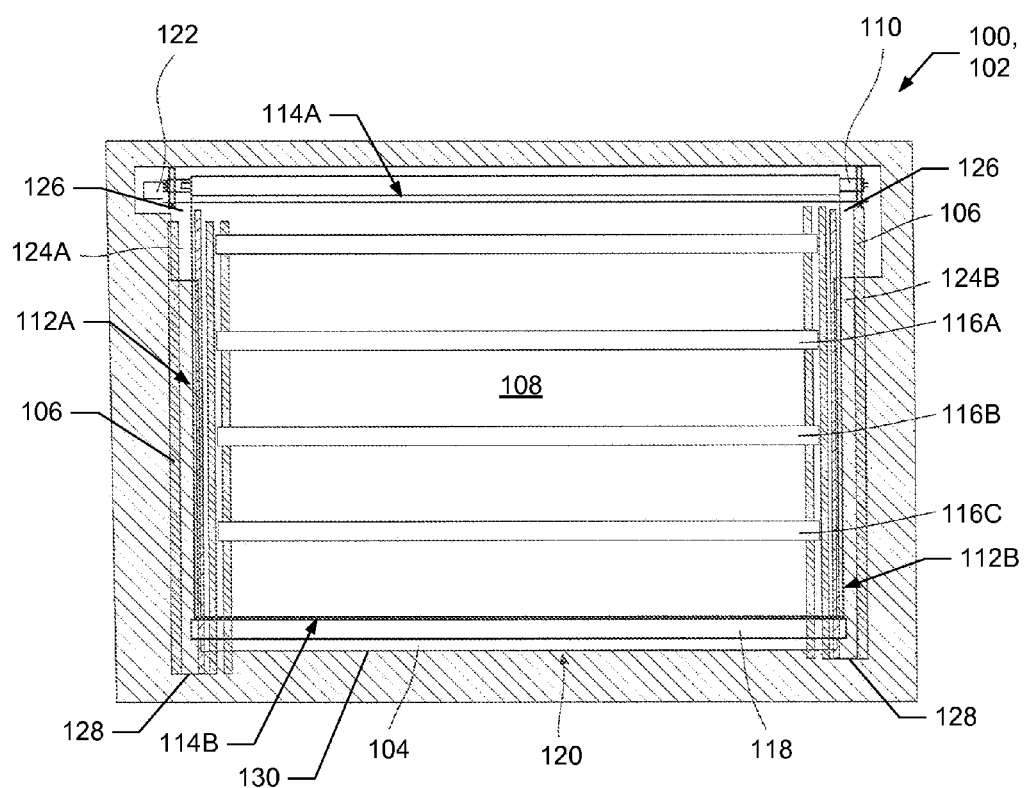
FIG. 1 displays a schematic, front, elevational view of a lead system, in accordance with an example embodiment, for use with, or as a component part of, a fire and smoke protection device for substantially sealing an opening in a building structure and limiting the spread of fire and smoke through the opening during a fire.

Referring now to the drawings in which like elements and steps have similar numbers throughout the several views, FIG. 1 displays a schematic, front, elevational view of a lead system 100 for use with, or as a component part of, a fire and smoke protection device 102 in accordance with an example embodiment. The fire and smoke protection device 102 (also sometimes referred to herein as the "device 102") enables substantial sealing of an opening 104 in a building structure and limiting of the spread of fire and smoke through the opening 104. The fire and smoke protection device 102 is adapted for secure connection to a wall 106 relative to the opening 104 and is configurable in a first configuration (also sometimes referred to herein as a "storage configuration") that permits ingress and egress through the opening 104 when no fire or smoke exists. The device 102 is also configurable in a second configuration (also sometimes referred to herein as a "fully-deployed configuration" or a "protection configuration") in which the device 102 significantly limits or prevents the spread of fire and smoke through the opening 104 during a fire. It should be noted that in FIG. 1, the cross-hatching is present to improve clarity and the differentiation of the various components of the lead system 100 and the fire and smoke protection device 102, and does not, necessarily, signify a section through an object.

Generally, the fire and smoke protection device 102 comprises a flexible protection member 108 and a winding shaft 110 about and onto which the flexible protection member 108 is fully-wound (and, hence, fully-retracted) when the device 102 is configured in the storage configuration so as not to occlude the opening 104. Conversely, the flexible element 108 is substantially fully-unwound from the winding shaft 110 when the device 102 is configured in the fully-deployed configuration so that the flexible protection member 108 fully occludes the opening 104. Thus, the flexible protection member 108 is selectively configurable to occlude or not occlude the opening 104.

The flexible protection member 108 includes a sheet-like member that is relatively thin in thickness as compared the lateral and longitudinal dimensions thereof. For reference, the term "longitudinal" is used herein to refer to the direction in which the flexible protection member 108 is deployed or retracted, and frequently has its longest dimension. The term "lateral" is used herein to refer to the direction perpendicular to the longitudinal direction and in which the flexible protection member 108 often has its shortest dimension (other than its thickness). The flexible protection member 108 may comprise a single layer of material, multiple layers of the same or different materials, and/or have adjoining portions comprising single or multiple layers of materials that are manufactured and arranged in various configurations to provide structural strength, stability, and resistance to forces applied during or shortly after exposure to high temperatures such as those that may be encountered with a fire. Typically, the flexible protection member 108 is manufactured using one or more fire resistant materials, including, without limitation, fire resistant woven and knitted fabric materials, metal foil materials, intumescent materials, and/or wire mesh materials. Possible different constructions of the flexible protection member 108 are described more fully in United States non-provisional patent application Ser. No. 13/738,431, which is entitled "Fire and Smoke Protection System" and filed on Jan. 10, 2013, the teachings of which are incorporated herein in their entirety by this reference.

The flexible protection member 108 has opposed first and second lateral edges 112A, 112B that extend in the longitudinal direction, and has opposed first and second longitudinal edges 114A, 114B that extend in the lateral direction. The first longitudinal edge 114A is connected to the winding shaft 110 to facilitate winding of the flexible protection member 108 onto and about the winding shaft 110 and unwinding of the flexible protection member 108 off of and from the winding shaft 110, as appropriate, during reconfiguration of the device 102 between the storage and protection configurations. The flexible protection member 108 also sometimes comprises one or more laterally-extending bars 116, with each bar 116 being offset from the immediately preceding and succeeding bars 116 in the longitudinal direction. Each bar 116 is connected to the material of the flexible protection member 108 and extends beyond the member's lateral edges 112 such that each of the bar's ends are received respectively within the lead guides 124 described below. To stabilize the surface area of the flexible protection member 108, it is recommended that the flexible protection member 108 include at least one and, perhaps, a few laterally-extending bars 116. Each bar 116 may or may not comprise a clamping member similar to those described in U.S. patent application Ser. No. 13/738,431 entitled "Fire and Smoke Protection System" filed on Jan. 10, 2013.

Additionally, in the example embodiment, the flexible protection member 108 may comprise a base board 118 attached at the member's second longitudinal edge 114B. The base board 118 extends laterally along longitudinal edge 114B at least between the member's lateral edges 112 and is sufficiently heavy as to maintain the flexible protection member 108 pulled taut when the device 102 is not in the storage configuration. When the device 102 is configured in the protection configuration, the base board 118 resides at and in contact with the foot 120 of the opening 104.

The fire and smoke protection device 102 also generally comprises a winding shaft motor 122 mechanically connected to the winding shaft 110 that is operable to rotate the winding shaft 110 in order to retract and wind the flexible protection member 108 onto the winding shaft 110, or to extend and unwind the flexible protection member 108 from the winding shaft 110. Through operation of the winding shaft motor 122, the device 102 may be additionally configured, generally temporarily, in a plurality of intermediate configurations such as the intermediate configuration illustrated in FIG. 1. As seen in FIG. 1, the flexible protection member 108 is substantially unwound from the winding shaft 110 and extended to significantly, although not entirely, occlude the opening 104. In other intermediate configurations, the flexible protection member 108 is partially unwound from the winding shaft 110 and occludes the opening 104 to a lesser or greater extent. It should be understood and appreciated that although the fire and smoke protection device 102 is oriented in FIG. 1 to deploy and retract the flexible protection member 108 in the vertical longitudinal direction, the flexible protection member 108 may be oriented to deploy and retract in the horizontal direction (or, for that matter, in other directions). It should also be understood and appreciated that, the flexible protection member 108 is not wound about a winding shaft 110, but is instead folded or gathered when in the storage configuration. When folded, the flexible protection element 108 always bends at the same bend locations. Conversely, when the flexible protection element 108 is gathered, bending occurs at random bend locations.

The lead system 100 of the example embodiment comprises a structure that is configured for cooperative operation with the above described fire and protection device 102 or, potentially, with other similar devices having similar flexible protection members 108 to direct and guide a flexible protection member 108 during reconfiguration between a storage configuration and a protection configuration and to limit the spread of fire and smoke around the flexible protection member 108. Additionally, the lead system 100 (also sometimes referred to herein as the "system 100") provides structural support for the flexible protection member 108 (which is generally not self-supporting) and resistance to forces applied to the flexible protection member 108 during a fire. According to the example embodiment, the lead system 100 is adapted to guide a flexible protection member 108 on a pre-determined linear path. However, in other example embodiments, the lead system 100 may be adapted to guide a flexible protection member 108 along a pre-determined non-linear path.

In accordance with the example embodiment, the lead system 100 comprises a first lead guide 124A and an opposed second lead guide 124B that are secured to the wall 106 of a building at respectively opposed locations relative to, in or near the opening 104. To integrate the system 100 into the building as unobtrusively as possible, the lead guides 124 are often mounted to the wall 106 or embedded within the wall 106 surrounding and forming the opening 104 through which the spread of fire and smoke is to be limited by the device 102. The lead guides 124 have first ends 126 and distant second ends 128 such that the lead guides 124 have a generally elongate shape. The lead guides 124 are mounted with their first ends 126 located nearest the device's winding shaft 110 and the second ends 128 nearest the base 130 of the opening 104.

The lead guides 124 define respective elongate openings 132 (see FIG. 2) and elongate cavities 134 (see FIG. 2) therein extending substantially between their first and second ends 126, 128 for respectively receiving the opposed lateral edges 112A, 112B of the flexible protection member 108. During winding or unwinding of the flexible protection member 108 onto/from the winding shaft 110 as the device 102 is reconfigured between the storage configuration and fully-deployed configuration, the lateral edges 112 of the flexible protection member 108 move respectively within and relative to the elongate openings 132 and elongate cavities 134 in a substantially longitudinal direction. In the protection configuration, the lateral edges 112 of the flexible protection member 108 reside within the elongate openings 132 and elongate cavities 134. The elongate openings 132 are sized and shaped in concert with the flexible protection member 108 such that the elongate openings 132 provide slight gaps having sufficient clearance for the lateral edges 112 of the flexible protection member 108 to slide within and relative to the respective guides 124, but do not provide gaps with the flexible protection member 108 of sufficient size for an appreciable amount of fire and/or smoke to pass through. To limit the spread of fire and smoke, the lead guides 124 employ an undercut or labyrinth construction, but it should be understood and appreciated that other structures and methods may be used. The lead guides 124 are described in greater detail below, but are generally manufactured from a plurality of components made from one or more materials that are appropriately selected and capable of withstanding the high temperatures produced by fires absent significant yielding, deflection, or deformation.

As described above, the lateral edges 112 of the flexible protection member 108 are respectively received by the lead guides 124 during reconfiguration of the device 102 between the storage configuration and protection configuration and while the device 102 remains in the storage configuration. The flexible protection member 108 has loops 136 (see FIG. 2) at each lateral edge 112 which are also respectively and similarly received by the lead guides 124.

Figure 2:
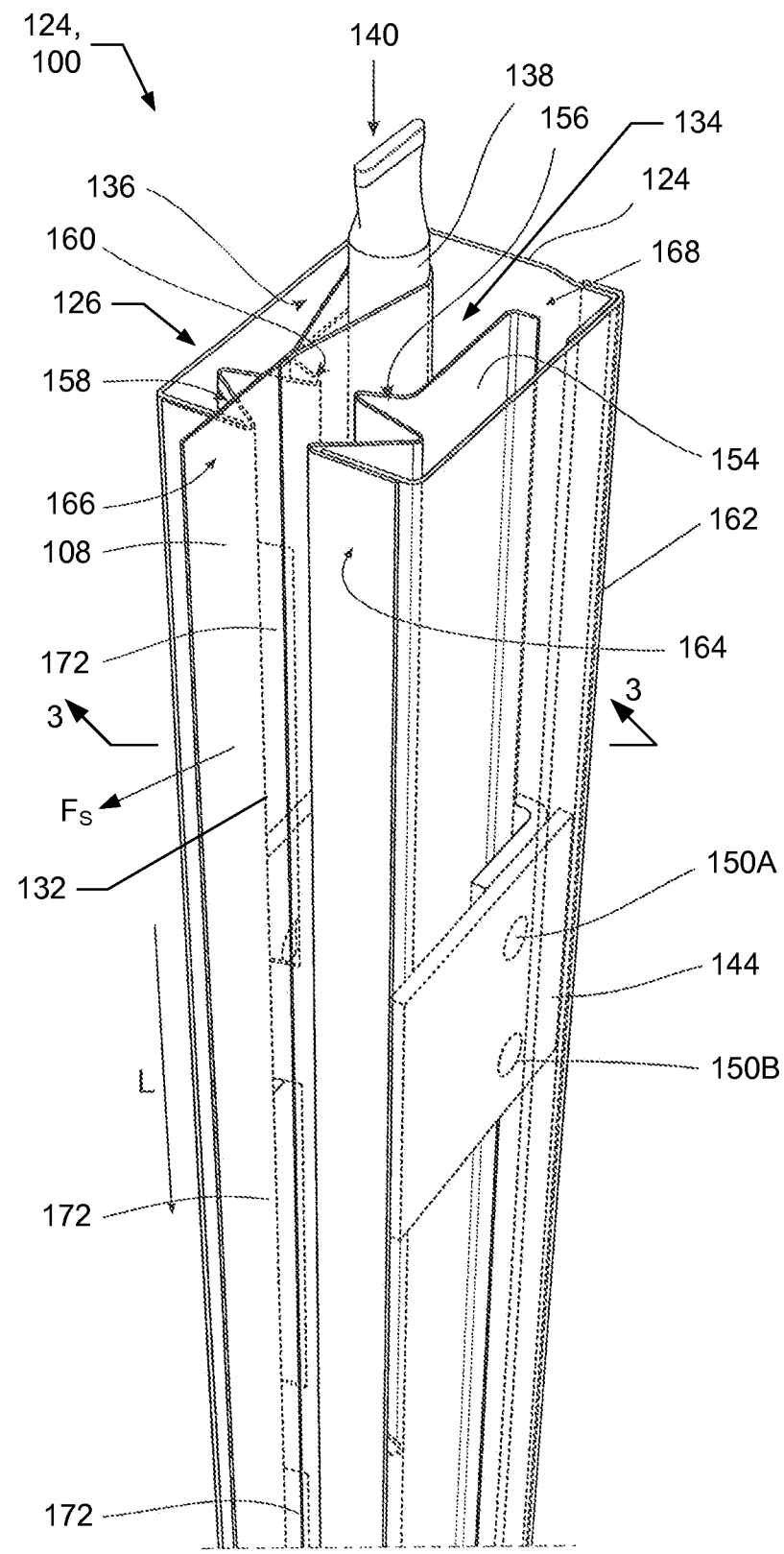
FIG. 2 displays a partial, schematic, perspective view of a lead guide of the lead system of FIG. 1.

FIG. 2 displays a partial, schematic, perspective view of a lead guide 124 of the system 100 in accordance with the example embodiment. Lead guide 124A is constructed as a mirror image of lead guide 124B and, therefore, the description of a lead guide 124 herein applies, generally, to both lead guides 124A, 124B. Each lead guide 124 comprises an elongate lead member 138 that is received by and within loops 136 of the flexible protection member 108. The lead member 138 extends in the longitudinal direction substantially between the lead guide's first and second ends 126, 128 and has a free, first end 140 nearest winding shaft 110 and a second end 142 resting on base 130. Together with each loop 136, the lead member 138 generally forms a lateral keder. A lead member 138, acceptable in accordance with the example embodiment, includes an elongate rod. Also, in an alternative example embodiment, the lead member 138 may be fixed at both ends.

Each lead guide 124 comprises an outer frame member 144 that is secured to (for example, by fasteners such as bolts or screws) and/or embedded into the wall 106 of a building and transfers any forces exerted by the flexible protection member 108 on the lead guide 124 to the building. The outer frame member 144 is designed to act like a brace to which the inner guiding members 154, 158 are fixed and, hence, includes a brace member 146 and a connecting member 148. The outer frame member 144 defines two threaded holes 150A, 150B. A fastener (not shown) is threadably engaged by and within the first hole 150A, in order to connect the brace member 146 of the outer frame member 144 with the connecting member 148. Similarly, a fastener (not shown) is threadably engaged by and within the second hole 150B, which fixes an outer frame plate 162 to the connecting member 148. The outer frame member 144 defines an elongated slot 152 that receives a fastener (not shown) through which the lead guide 124 is secured to the building's wall 106.

Each lead guide 124 also comprises a first inner guiding member 154 formed, according to the example embodiment, by a profiled metal guide sheet. The metal guide sheet is prism-shaped, which means that the cross-section along a longitudinal axis, L, does not fundamentally change. The first inner guiding member 154 is bent in such a way that it forms a first protrusion 156. The lead member 138 is positioned relative to the first protrusion 156 in such a way that a tractive force, Fs, pulls the lead member 138 against the first protrusion 156. However, the lead member 138 cannot slide past the first protrusion 156. Additionally, the lead guide 124 comprises a second inner guiding member 158 from which a second protrusion 160 extends. According to the example embodiment, the second inner guiding member 158 is designed to be a minor image of the first inner guiding member 154. Alternatively, in other embodiments, the second inner guiding member 158 is not a mirror image of the first inner guiding member 154.

In addition, each lead guide 124 comprises an outer frame plate 162 which is fixed to the outer frame member 144 and encloses the inner guiding members 154, 158. When the lead system 100 has been installed, the outer frame plate 162 is generally positioned with one side against or embedded in the wall 106. The inner guiding members 154, 158 may, alternatively, with the outer frame plate 162 form a single component. However, it is more advantageous if the inner guiding members 154, 158 are separate components, as in the example embodiment, which are connected with the outer frame plate 162.

In accordance with the example embodiment, the inner guiding members 154, 158 are only connected with the outer frame plate 162 along their respective first long sides 164, 166. The first inner guiding member 154 has a second long side 168 opposite the first long side 164, which forms a free end, meaning advantageously that the second long side 168 is not fixed to another component and that may move relative to the outer frame member 144. The second inner guiding element 158 has a second long side 170 opposite the first long side 166, which also forms a free end such that the second long side 170 is beneficially not fixed to another component and able to move relative to the outer frame member 144. By virtue of the inner guiding members 154, 158 having free ends, the outer frame member 144 can warp during a fire and deform for a substantial period of time without the resulting forces excessively deforming the inner guiding members 154, 158.

Notably, the inner guiding members 154, 158 are generally more giving than the outer frame of the lead guide 124. In other words, the inner guiding members 154, 158 yield to an external force whereas the other components of the lead system 100 do not. This means that the inner guiding members 154, 158 become deformed when a force acts upon the flexible protection element 108. For example, when a water jet such as that from a fire hose is aimed at the flexible protection member 108 within the scope of the Hose Stream Test, the flexible protection member 108 bulges out and absorbs the pressure of the water jet. As a result, the inner guiding members 154, 158 become deformed and allow the flexible protection member 108 to bulge out even further. In contrast, the outer frame of the lead guide 124 remains substantially undistorted.

Further, it is advantageous if the inner guiding members 154, 158 act as a spring. As described above, the inner guiding members 154, 158 are formed from metal guide sheets that are fixed only along their respective first long sides 164, 166 to the outer frame plate 162 and have respective protrusions 156, 160 that are engaged by corresponding lead members 138. Since metal guide sheets having relatively high dimensional stability in the event of fire are easy to produce, the inner guiding members 154, 158 may be manufactured to also have relatively high dimensional stability. However, even though the inner guide members 154, 158 have relatively high dimensional stability, the inner guide members 154, 158 may still deform or distort elastically if the flexible protection member 108 bulges out in response to the application of a force to the flexible protection member 108. During such deformation or distortion, the protrusions 156, 160 move relative to the outer frame member 144 which is securely connected to the wall 106 of the building. Since the inner guiding members 154, 158 are fixed only along their respective first long sides 164, 166, such elastic deformation or distortion occurs more readily.

The connections between the inner guiding members 154, 158 and the outer frame plate 162, which may be made, for example, using welding points, solder points, screws, rivets, adhesive or similar, are formed in such a way that the connections can safely bear the forces that occur during normal operation. However, it is beneficial if the connections are designed to be so weak that they come loose in the event of a fire. Generally, this causes the outer frame plate 162 to become very distorted, as a result of the heat from the fire. Since the inner guiding members 154, 158 are better protected against heat, they become less distorted.

When the connections come loose, no forces are transferred from the outer frame plate 162 to the inner guiding members 154, 158. This means that the inner guiding members 154, 158 become less distorted and the lead member 138 remains securely in place. In other words, the lead member 138 cannot be pulled or torn out of the lead guide 124 if the outer frame plate 162 becomes very warped.

The second inner guiding member 158 (which may be omitted from a lead guide 124 if a protrusion exists elsewhere which can support the lead member 138) defines several recesses 172 arranged in such a way that the flexible protection member 108 does not come into contact with them and so does not cause additional friction near the member's edges. The recesses 172 weaken the second inner guiding member 158, so that the member distorts more easily when the tractive force, Fs, is exerted on the flexible protection element 108. Furthermore, any distortions of the outer frame plate 162 do not cause the inner guiding member 154 to also distort in the area engaged by the lead member 138. The recesses 172 also stretch for the longitudinal length along the longitudinal axis, L, on which the inner guiding member 154 is connected with the outer frame member 144. This leads to an S-shaped transfer of forces from the lead member 138 via the inner guiding members 154, 158 and the outer frame member 144 to the building and, therefore, to a higher flexibility.

Figure 3:
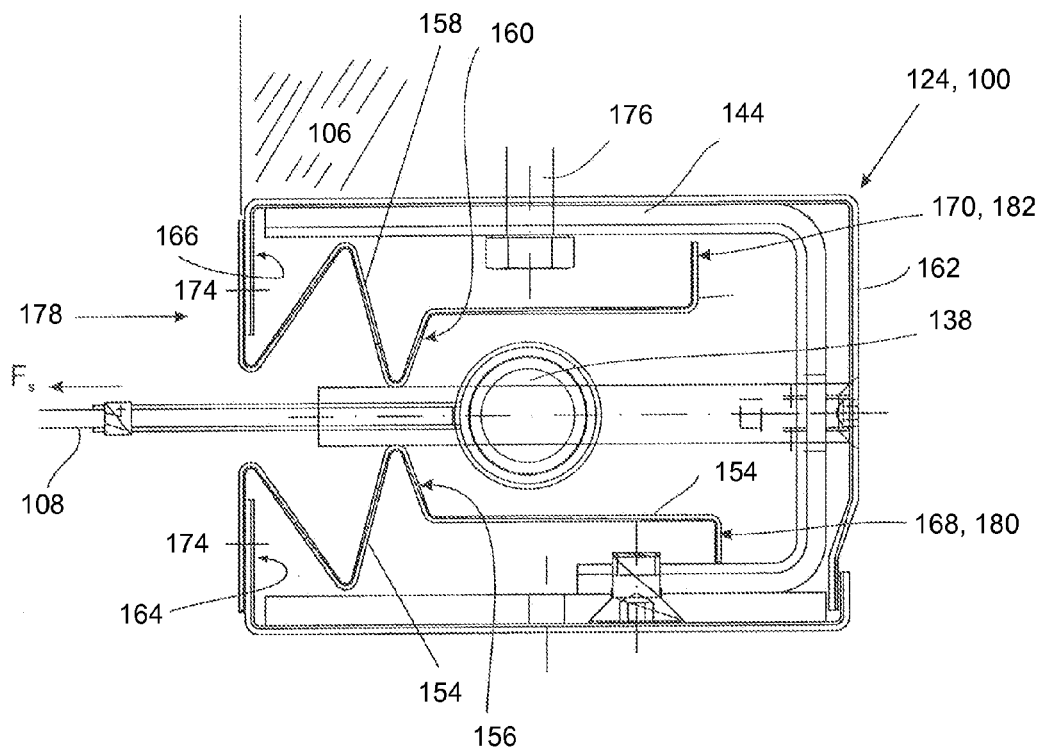
FIG. 3 displays a schematic, cross-sectional view of the lead guide of FIG. 2 taken along lines 3-3.

FIG. 3 displays a schematic, cross-sectional view of the lead guide of FIG. 2 taken along lines 3-3 thereof. It should be recognized that the inner guiding members 154, 158 are connected with the outer frame plate 162 by means of point-to-point connections 174 in the form of connection points. According to the example embodiment, the point-to-point connections 174 are formed from a non-heat resistant material, such as plastic.

The outer frame member 144 is connected with the wall 106 by a fastener 176 such as, for example and not limitation, a screw. It should be recognized that an end face 178 of the lead guide 124 is flush with the wall 106. Of course, it is also possible that the end face 178 protrudes above the wall 106 or is offset backwards. The outer frame plate 162 is located between the wall 106 and the outer frame member 144 and is, thus, connected with the wall 106.

As seen in FIG. 3, the lead member 138 has no contact with the protrusions 156, 160 if there is no tractive force acting on the flexible protection element 108. The inner guiding members 154, 158 each have a free end 180, 182 that is situated opposite to the end that is connected with the outer frame plate 162. The free ends 180, 182 may be moved freely relative to the outer frame member 144 and the outer frame plate 162. If a tractive force, Fs, is exerted on the flexible protection element 108, the lead member 138 presses onto the first and second protrusions 156, 160. As a result, the inner guiding members 154, 158 become distorted, as is depicted by the dotted line in FIG. 4.

Figure 4:
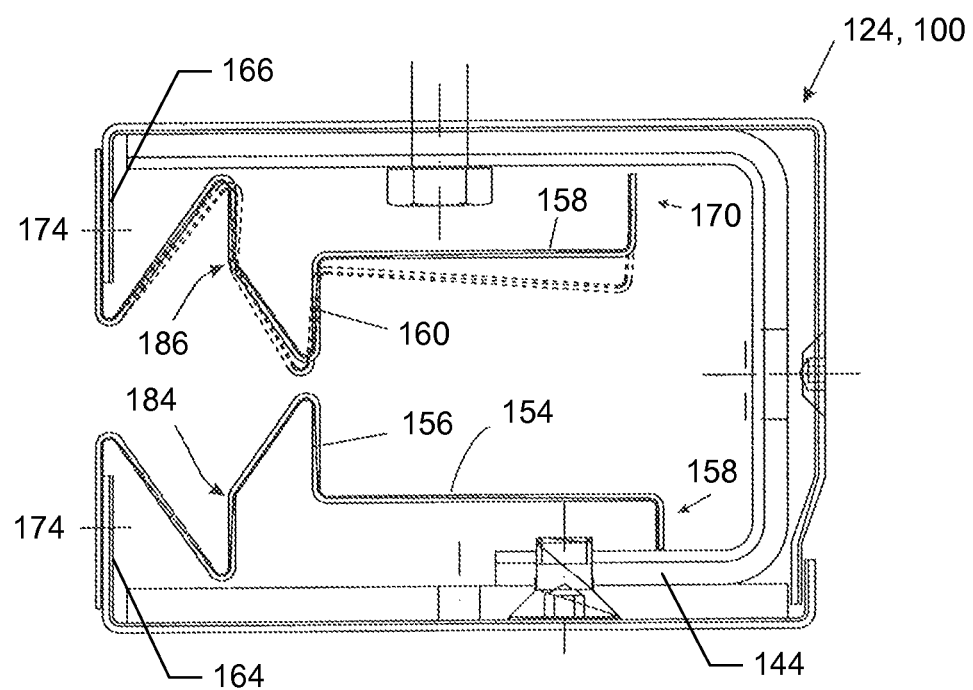
FIG. 4 displays a schematic, cross-sectional view of a lead guide, according to an alternate example embodiment, taken along similar lines as the cross-sectional view of FIG. 3.

FIG. 4 displays a schematic, cross-sectional view of a lead guide 124, according to an alternate example embodiment, taken along similar lines as the cross-section of FIG. 3. According to the alternate example embodiment, the inner guiding members 154, 158 are additionally bent at the bending points 184, 186, causing the inner guiding members 154, 158 to become even more giving and enabling increased stretching and bulging of the flexible protection member 108. In other words, the additional bending points weaken the inner guiding members 154, 158.

Figure 5:
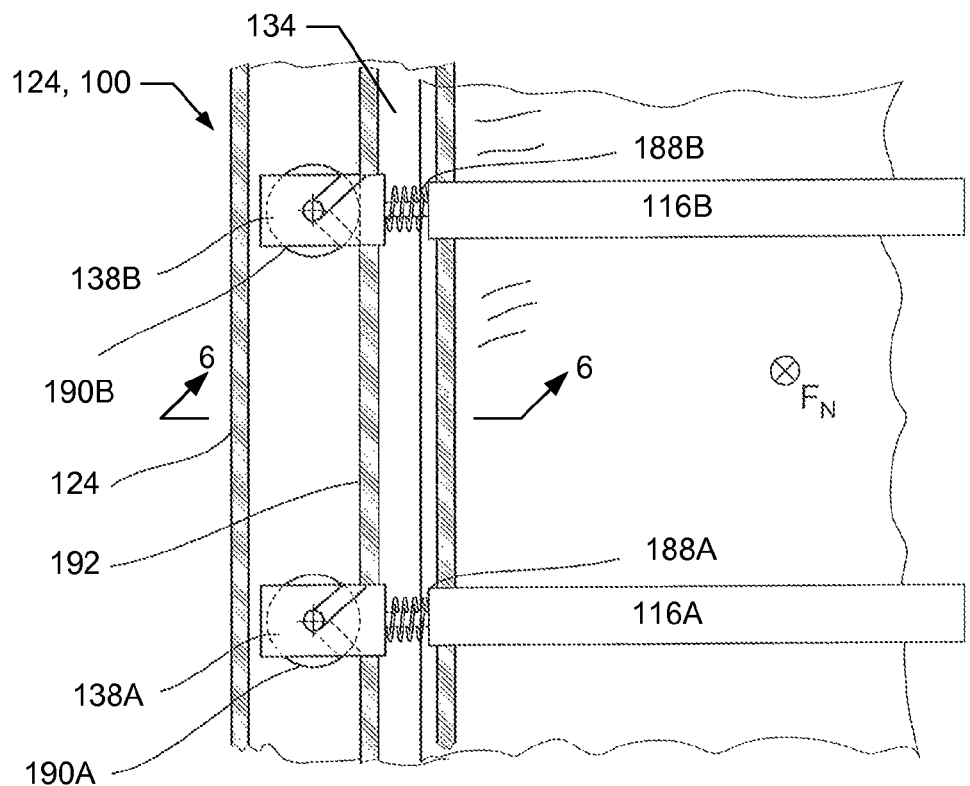
FIG. 5 displays a partial, schematic, cross-sectional view of a lead guide, according to an alternate example embodiment, showing the interaction between the lead guide and laterally-extending bars of a flexible protection member.

FIG. 5 displays a partial, schematic, cross-sectional view of a lead guide 124, according to an alternate example embodiment, showing the interaction between the lead guide 124 and laterally-extending bars 116 of a flexible protection member 108. As seen in FIG. 5, the flexible protection member 108 comprises a plurality of laterally-extending bars 116. The lead system 100 further comprises one or more expandable/compressible members 188 such that each laterally-extending bar 116 of the flexible protection member 108 extends into a lead guide 124 and is connected to the lead system 100 via an expandable/compressible member 188 arranged proximate the lead guide 124. When a force acts upon the laterally-extending bars 116 such as when a water jet strikes the flexible protection member 108 during a fire or during the Hose Stream Test, the expandable/compressible members 188 stretch even though the laterally-extending bars 116 do not generally stretch. By virtue of the expandable/compressible members 188 stretching, the flexible protection member 108 (to which the laterally-extending bars 116 are attached) is permitted to stretch and bulge out, thereby resisting and withstanding the force.

Also, as seen in FIG. 5, the lead guide 124 comprises a plurality of rollers 190 and an internal wall 192 such that the rollers 190 are guided along and roll in contact with the internal wall 192. As described below, the internal wall is formed by a protrusion. During reconfiguration of the fire and smoke protection system 102 between the storage and protection configurations, the laterally-extending bars 116 move in concert with the remainder of the flexible protection member 108. Through rolling of the rollers 190 along the internal wall 192 during such reconfiguration, movement of the laterally-extending bars 116 is aided.

It should be understood and appreciated that while FIG. 5 displays only one lead guide 124, the other opposing lead guide 124 is substantially a minor image of the displayed lead guide 124 having a similar internal wall 192. Additionally, it should be understood and appreciated that the lead system 100 further comprises one or more expandable/compressible members 188 and one or more rollers 190 that are connected and interact with the respective laterally-extending bars 116 in the other opposing lead guide 124 in a substantially similar manner.

In addition, it should be recognized that the elongate cavities 134 of the lead guides 124 respectively receive the lateral edges 112 of the flexible protection member 108 when the device 102 is in the protection configuration or transitioning between the storage and protection configurations. Because the expandable/compressible elements 188 and rollers 190 are similarly present within the lead guides 124 at similar times, the expandable/compressible elements 188 and rollers 190 are protected from view and the impact of the heat of a fire by the outer frame plates 162 of the lead guides 124.

In a similar alternate embodiment, the flexible protection member 108 may comprise at least two layers including, for example and not limitation, fire resistant material. The expandable/compressible elements 188 and/or rollers 190 may be arranged within the layers to protect the expandable/compressible elements 188 and/or rollers 190 from heat as well as from mechanical forces.

Figure 6:
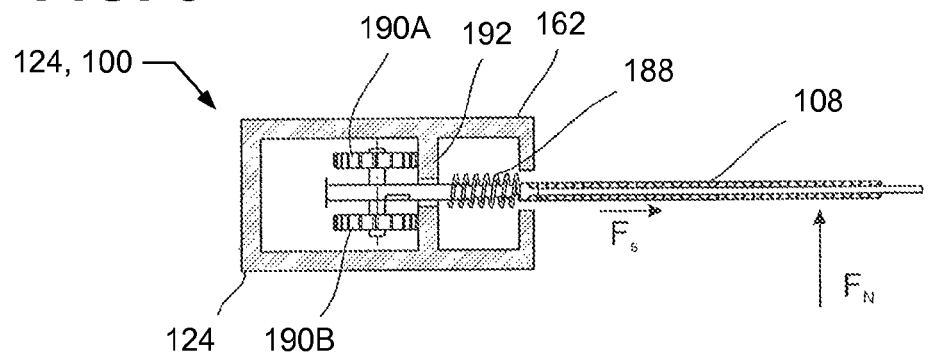
FIG. 6 displays a partial, schematic cross-sectional view of the lead guide of FIG. 5 taken along lines 6-6.

FIG. 6 displays a partial, schematic, cross-sectional view of the lead guide of FIG. 5 taken along lines 6-6. As seen FIG. 6, each expandable/compressible member 188 includes, for example, a spring which stretches when a tractive force, Fs, is exerted on the flexible protection element 108. The tractive force, Fs, occurs when a normal force, $F_N$, which acts upon the flexible protection member 108 in the normal direction (e.g., in the direction of the thickness of the flexible protection member 108), is exerted. For example, the normal force, $F_N$, occurs when a jet of fire extinguishing water hits the flexible protection member 108. Due to the fact that the expandable/compressible element 188 is flexible, the constraining force is reduced, in the form of the tractive force, Fs, that is acting upon the flexible protection member 108. It is particularly advantageous if the expandable/compressible element 188 comprises a compression spring. However, in other alternative example embodiments, the expandable/compressible element 188 may comprise a spiral spring, conical spring, leaf spring, plate spring or an evolute spring.

In addition, it should be noted that the expandable/compressible member 188 does not have to include a spring. For example, it is also possible that the expandable/compressible member 188 is not heat resistant. In this way, it is possible for the laterally-extending bars 116 to comprise two parts which slide against and relative to one another, meaning that these two parts are guided together. For example, each of the parts comprises a protrusion that is guided into a slot of the respective other part. The slot is filled with a thermally instable element (e.g. a plastic element) so that the two parts cannot move against one another during normal operation. In the event of a fire, the plastic melts or burns and leaves the slot open. The two parts can then slide against one another.

In use, when the fire and smoke protection device 102 is reconfigured from the storage configuration to the protection configuration, the loops 136 at the lateral edges 112 of the flexible protection member 108 are threaded onto the respective lead members 138 of the lead system 100 such that the loops 136 respectively receive the lead members 138 therein. To do so, the flexible protection member 108 is pulled over fixed discharge edges that are respectively arranged near the first ends 140 of the lead members 138. The fixed discharge edges and lead members 138 ensure that the flexible protection element 108 always enters and exits the lead system 100 and the lead guides 124 thereof at the same position relative to the first ends 140 of the lead members 138.

During or after deployment of the flexible protection member 108 into the protection configuration, the lead members 138 are connected with the flexible protection member 108 and produce the forces that keep the flexible protection member 108 in place, even while external forces are acting on the flexible protection member 108. If the flexible protection member 108 is subsequently retracted into the storage configuration, the lead members 138 remain in place and the loops 136 of the flexible protection member 108 slide along and relative to the respective lead members 138 in the longitudinal direction toward the members' first ends 140. The flexible protection member 108 is wound onto the winding shaft 110 as the loops 136 of the flexible protection member 108 slide along and become unthreaded from the lead members 138.

It should be understood and appreciated that each of the lead members 138 may, in an alternative example embodiment, comprise a roll or guide shoe that slides onto/off of the lead members 138, as appropriate, when the flexible protection member 108 is reconfigured between the storage and protection configurations. Regardless of their configuration, the lead members 138 generally hold the flexible protection member 108 relatively still in the lateral direction and are supported by the inner guiding members 154, 158. The inner guiding members 154, 158 direct and transmit the forces acting on the flexible protection member 108 to the building's wall 106 via the outer frame members 144 of the lead guides 124.

Whereas the present invention has been described in detail above with respect to example embodiments thereof, it should be appreciated that variations and modifications might be effected within the spirit and scope of the present invention.

What is claimed is:

1. A lead system for a fire and smoke protection device having a flexible protection member configurable between a retracted storage configuration and a deployed protection configuration in which the flexible protection member substantially seals an opening in a building wall and limits the spread of fire and smoke through the opening, said lead system comprising:
   a first elongate guide adapted for mounting near the opening and for directing the flexible protection member during movement between the storage configuration and the protection configuration;
   a second elongate guide adapted for mounting near the opening opposed to said first elongate guide and for directing the flexible protection member during movement between the storage configuration and the protection configuration;
   wherein at least one of said first elongate guide and said second elongate guide comprises
   an elongate outer frame member adapted for connection to the building wall near the opening in the building wall,
   an elongate lead member extending within said elongate outer member and adapted to slidably guide an edge of the flexible protection member within said at least one of said first elongate guide and said second elongate guide during movement of the flexible protection member between the storage configuration and the protection configuration, said elongate lead member retaining said edge of said flexible protection member in said protection configuration, and
   one or more elongate inner guiding members extending substantially parallel to said elongate lead member within said elongate outer frame member and having at least one protrusion arranged to provide a gap sized to allow said flexible protection member to extend through said gap and to prevent said elongate lead member from passing through said gap; and
   wherein said one or more elongate inner guiding members are configured to deflect toward an opposing side of said gap such that said gap reduces in size and moves in a direction of a body of the flexible protection member in response to lateral movement and engagement by said elongate lead member due to the application of an external force to the body of the flexible protection member.

2. The lead system of claim 1, wherein said elongate outer frame member is adapted for embedding in the building wall.

3. The lead system of claim 1, wherein said one or more elongate inner guiding members each comprise a profiled metal guide sheet.

4. The lead system of claim 1, wherein said one or more elongate inner guiding members comprises a first elongate inner guiding member and a second elongate inner guiding member substantially opposed to said first elongate inner guiding member, and wherein said protrusion of each of said first and second elongate inner guiding members form opposite sides of said gap.

5. The lead system of claim 1, wherein said one or more elongate inner guiding members are adapted to deflect independently of deflection of said elongate outer frame member.

\* \* \* \* \*